Jan. 5, 1943.     J. M. CUNNINGHAM     2,307,112
CLUTCH MECHANISM
Filed Aug. 27, 1941

INVENTOR
J. M. Cunningham
BY
ATTORNEY

Patented Jan. 5, 1943

2,307,112

UNITED STATES PATENT OFFICE 2,307,112

CLUTCH MECHANISM

James M. Cunningham, Endicott, N. Y., assignor to International Business Machines Corporation, New York, N. Y., a corporation of New York Application August 27, 1941, Serial No. 408,499

5 Claims. (Cl. 74—436)

This invention relates to drive mechanisms, and, more particularly, to clutch mechanisms associated with such drive mechanisms as used on high speed card perforating machines and the like, in which intermittent motion is obtained through a Geneva gear.

In mechanisms employing Geneva gearing for securing uniform step by step motion from a constant speed driving source, it may be necessary to disengage the driving part from the driven part in order to perform certain operations. However, in any such mechanical disengagement the driven part must be held and locked in a predetermined position so that the driving part may be reengaged at a later time without interrupting the orderly sequence of such step by step motion.

One mechanism used for obtaining such a result consists of a one tooth clutch gear mounted on the driven shaft, a dog bearing a roller which engages with and drives the Geneva gear, and a means for causing the dog to be engaged and disengaged with the notch in the one tooth gear. Such a mechanism is shown and described in United States Patent No. 2,032,805 to provide a clutch connection between a Geneva gear and a pair of feed rolls for preventing the feeding of record cards when punching of the cards is to be withheld.

At very high speeds the one tooth clutch may be quite susceptible to wear because of the excessive vibration brought about by the Geneva motion. The clutch dog, its mounting pin, and the ratchet tooth may become worn rapidly, and perhaps require adjustment or even replacement. Furthermore, the release position of the dog, in such an arrangement, must be accurately adjusted to coincide with the stop position of the Geneva gear so that the dog will be aligned with the single notch in the one tooth gear for reengagement when the mechanism is again to be "clutched in." Parts for such mechanism must be accurately manufactured and are consequently expensive. Wear upon these parts may destroy their accuracy to a point where adjustment can no longer be made to compensate.

It is, accordingly, an object of this invention to provide an improved clutch mechanism requiring little or no critical adjustments.

It is another object of this invention to provide an improved clutch mechanism for disconnecting the driving part of a Geneva gear mechanism from the driven part by an arrangement in which frictional wear is reduced to a minimum.

It is a still further object of this invention to provide a low cost clutch mechanism of improved construction from simply, easily manufactured parts.

Other objects of the invention will be pointed out in the following description and claims and illustrated in the accompanying drawing, which discloses, by way of example, the principle of the invention and the best mode, which has been contemplated, of applying that principle.

Figure 1:
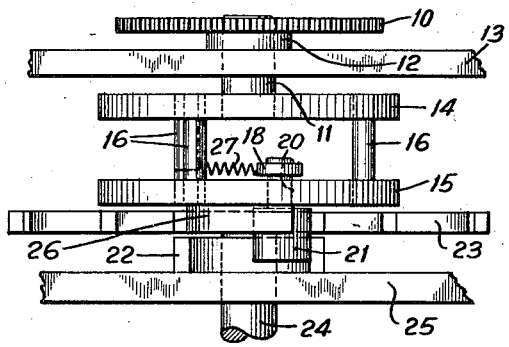
Fig. 1 is a plan view of the clutch mechanism as applied to rotate one shaft with uniform intermittent motion from another shaft rotating at constant speed.

Referring to Fig. 1, continuous drive motion is supplied to shaft 11 by a gear 10 which turns in the bearing 12 in the side plate 13. A disk 14 is fastened to the other end of shaft 11. A second disk 15 is secured to and spaced from the disk 14 by three spacer pins 16. An arcuate slot 17 is cut through the disk 15 (see Fig. 2 also). An arm 18 is pivotally mounted upon the rear face of disk 15 by the pin 19 (see Fig. 2). On the one end of arm 18 a shaft 20 is mounted projecting through the slot 17 which limits the travel of the arm 18.

Fastened upon shaft 20 and spaced from the disk 15 is a roller 21 which coacts with an arcuate shroud 22 and with the Geneva gear 23 which is mounted on a shaft 24. The arcuate shroud 22 is stationary, having its concave surface towards the center of the disk 15, and is mounted on another side plate 25. A hollow sector 26 protrudes from the disk 15, being concentric with the latter, and cooperates with Geneva gear 23 to lock and unlock it. The arm 18 is normally urged outwards by a spring 27 (see Fig. 3 also), the roller 21 tending to engage a slot in the Geneva gear 23. A pivoted lever 28 with a fulcrum 29, linkage 30, and operating arm 31, is normally held in the position shown in Fig. 2 by a spring 32 so that a cam face 33 on the end of the lever 28 normally forces the roller 21 into the hollow sector 26 as the disk 15 is rotated (see Fig. 2).

Figure 3:
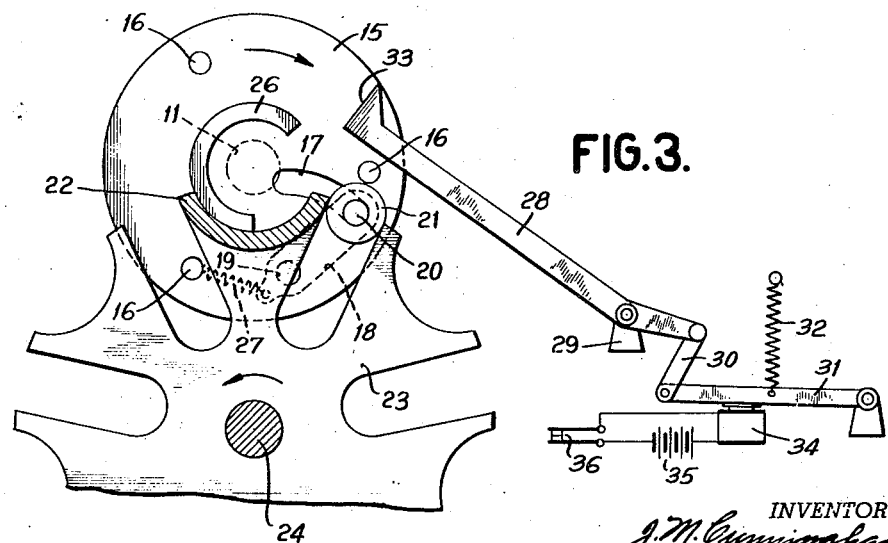
Fig. 3 is a view similar to Fig. 2 showing the clutch mechanism engaged and about to drive the Geneva gear.

In order to actuate the clutch, a magnet 34 is provided to cooperate with the operating arm 31 to cause lever 28 to be pulled away from the sector 26 and allow the roller 21 to engage a slot in the Geneva gear 23 as shown in Fig. 3. The magnet 34 is energized by a battery 35 through closing of a pair of contact points 36.

The operation of the clutch mechanism is simple. Disk 15 is continuously rotated in a clockwise direction by the gear 10. The roller 21 mounted on the end of arm 18 by shaft 20 is continually urged towards the periphery of disk 15 by the spring 27 and the centrifugal force of rotation so that the roller shaft 20 would be at the outward or peripheral extremity of slot 17 (see Fig. 3).

Figure 2:
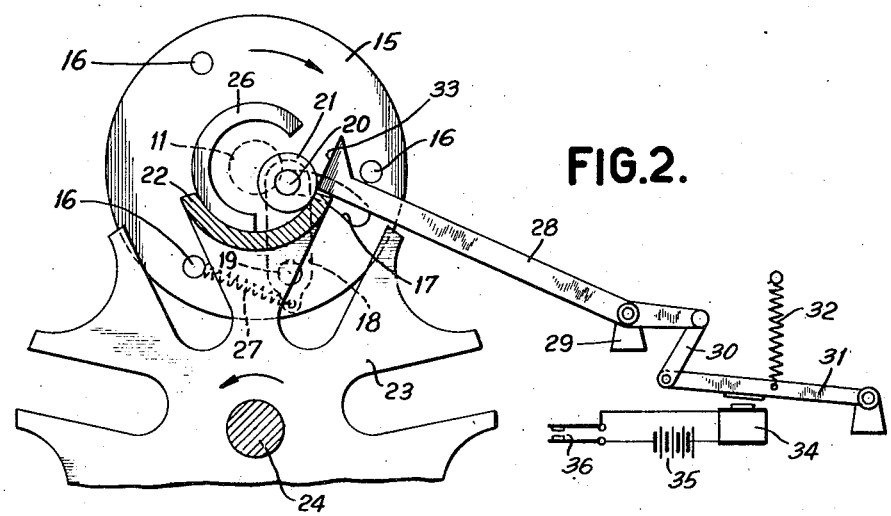
Fig. 2 is a partial elevation view of Fig. 1 having added clutch controlling means, the view showing the clutch mechanism disengaged so that the Geneva gear is held locked.

When the clutch is disengaged the roller 21, however, is cammed into the hollow sector 26 by the cam face 33 of lever 28 (as shown in Fig. 2) so that the driven Geneva gear 23 is retained locked in position by the roller 21 riding upon the concave face of the arcuate shroud 22 and a curved tooth of Geneva gear 23 even when released by sector 26.

When the clutch is to be engaged, however, the magnet 34 is energized pulling down the operating arm 31. Lever 28 now moves to the upward position (see Fig. 3) so that cam face 33 no longer cams the roller 21 into the hollow sector 26. Consequently, the roller 21 engages a slot in the Geneva gear (as in Fig. 3), causing the latter to be rotated in a counterclockwise direction as it is released by the sector 26. The roller 21 is maintained in proper position by the convex face of the shroud 22, and the Geneva gear is advanced one tooth.

A simple, rugged clutch mechanism is thus provided in this invention which requires no critical adjustments. High speed operation tends to aid engagement of the clutch because of the increased centrifugal force. The disengagement is positive and easily controlled. Practically all frictional contact is made by the roller thereby materially reducing frictional wear of the parts. Finally, the components of the disclosed mechanism can be easily and cheaply manufactured with comparatively great tolerance.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a clutch mechanism wherein a Geneva gear is alternately driven and locked, a rotary drive member having an arcuate slot cut through its faces, a Geneva gear over-lapping the said member and spaced from its front face, a spring controlled pivot arm upon the rear face of the said member, a shaft upon the end of said arm, the said shaft protruding through the said slot, the latter limiting the travel of said arm, a projecting hollow sector upon the front face of the said drive member concentric with the latter, the outer face of the said hollow sector alternately engaging the said Geneva gear to lock and unlock it, a stationary arcuate shroud having its concave face coincident with the outer face of the said sector, a roller on the shaft of the said arm, the said roller being spaced from the front face of the said drive member, the said roller being normally cammed outwards by the convex face of the said shroud to engage and drive the said Geneva gear as it is unlocked by the said sector, and means to cam the said roller into the said hollow sector, and thereby causing it to be retained by the concave face of the said shroud, for preventing engagement of the said roller with the said Geneva gear and for locking the latter when the said sector unlocks it.

2. In a Geneva gear movement, a driving wheel and a driven wheel mounted to rotate on parallel axes, said driven wheel having a plurality of symmetrically arranged radial slots therein and concave peripheral locking surfaces between said slots, said driving wheel having thereon a driving element and a convex locking sector adapted to coact with successively presented concave locking surfaces of said driven member, said driving element being mounted on said driving wheel for a limited movement toward and away from the axis of rotation of said driving wheel, at one limit of which movement said driving element is positioned to enter successively presented radial slots of said driven wheel, and at the other limit of which movement said driving element is positioned to coact with the concave locking surface of said driven wheel, from which said locking sector is just receding.

3. In a Geneva gear movement, a driving wheel and a driven wheel mounted to rotate on parallel axes, said driven wheel having a plurality of symmetrically arranged radial slots therein and concave peripheral locking surfaces between said slots, said driving wheel having thereon a driving element and a convex locking sector adapted to coact with successively presented concave locking surfaces of said driven member, said driving element being mounted on said driving wheel for a limited movement toward and away from the axis of rotation of said driving wheel, said driving element being positioned at the inner limit of its movement so that its outer surface is concentric with the arc of said locking sector, and being positioned at the outer limit of its movement wholly outside of the circle determined by the arc of said locking sector and in alignment with a radial slot of said driven wheel.

4. A Geneva gear movement as described in claim 2, wherein means are provided for selectively shifting said driving element from one limit position to another.

5. A Geneva gear movement as described in claim 3, wherein a stationary concavo-convex shroud is positioned in coacting relation with said driving element and with its concave face in alignment with the active concave locking surface of said driven wheel and its convex surface in position to hold said driving element in its outer limit position, from the time said driving element enters a radial slot of said driven wheel until it leaves such slot.

JAMES M. CUNNINGHAM.